United States Patent [19]
Denneau et al.

[11] Patent Number: 5,371,735
[45] Date of Patent: Dec. 6, 1994

[54] COMMUNICATION NETWORK WITH NON-UNIQUE DEVICE IDENTIFIERS AND METHOD OF ESTABLISHING CONNECTION PATHS IN SUCH A NETWORK

[75] Inventors: Monty M. Denneau, Brewster; Peter H. Hochschild, New York, both of N.Y.; Craig B. Stunkel, Bethel, Conn.

[73] Assignee: International Business Machines Corporation, Armonk, N.Y.

[21] Appl. No.: 26,332

[22] Filed: Mar. 4, 1993

[51] Int. Cl.$^5$ .......................... H04J 3/24; H04L 12/50
[52] U.S. Cl. ...................................... 370/54; 370/58.1; 370/92
[58] Field of Search ............... 370/54, 60, 92, 93, 370/94.1, 94.3, 110.1, 53, 58.1, 58.2, 60.1, 65.5, 94.2; 340/825.02, 826, 825.52

[56] References Cited

U.S. PATENT DOCUMENTS

| | | | |
|---|---|---|---|
| 4,801,934 | 1/1989 | Herkert | 340/825.02 |
| 4,993,018 | 2/1991 | Hajikano et al. | 370/54 X |
| 5,291,477 | 3/1994 | Liew | 370/58.1 X |

FOREIGN PATENT DOCUMENTS

| | | | |
|---|---|---|---|
| 0169455 | 7/1985 | European Pat. Off. | G06F 15/16 |
| 0509126A1 | 4/1991 | European Pat. Off. | G04F 15/16 |

OTHER PUBLICATIONS

IBM Tech. Disc. Bulletin V. 36 #3 Mar. 1993 Anon "Functional Addressing" p. 179.
Patent Abstracts of Japan V16 #536, p. 1449 Nov. 1992 I. Yasuo "Microprogram Load Control System" (JP-A-04 199 445).

*Primary Examiner*—Melvin Marcelo
*Attorney, Agent, or Firm*—Marc D. Schechter; Robert P. Tassinari, Jr.

[57] ABSTRACT

A communication network having a service processor, a plurality of terminal nodes, and a network of switch nodes for switchably connecting the service processor to each terminal node by way of one or more connection paths. Each switch node in the communication network is connected to the service processor either directly or through one or more other switch nodes. Each terminal node of the communication network is connected to a switch node. Each switch node and each terminal node has a device identification. At least two nodes have the same device identification. Each target node having the same device identification as another node can preferably be connected to the service processor by way of at least one connection path which does not include any other node having the same device identification as the target node. All switch nodes having the same minimum connection path length may, for example, have the same device identification.

14 Claims, 8 Drawing Sheets

COMMUNICATION NETWORK WITH NON-UNIQUE DEVICE IDENTIFIERS AND METHOD OF ESTABLISHING CONNECTION PATHS IN SUCH A NETWORK

BACKGROUND OF THE INVENTION

The invention relates to communication networks, such as for parallel processing systems.

Parallel processing systems are computer systems containing large numbers of terminal nodes. The terminal nodes may be, for example, processors, memory elements, input/output servers, or other computer devices. The terminal nodes in parallel systems are commonly connected by a network of switch nodes that transfer information signals between the terminal nodes. Terminal nodes and switch nodes may be referred to collectively as network devices.

Message-passing networks typically route message packets by circuit-switching or by packet-switching. In circuit-switching, control packets create a source-to-destination message path through the network by configuring individual switches along the desired connection path or circuit. Once a circuit is configured, one or more message packets are transmitted from the source to the destination over the circuit. In contrast, for packet-switching, each message packet is self-routing. That is, each message packet contains its own routing information which controls the individual switches dynamically.

A circuit-switched network can be subclassified according to the underlying method of circuit configuration used by the control packets. If the control packets also obey circuit-switching to configure the network, the network is referred to as totally circuit-switched. In contrast, it is possible to construct a network in which control packets are packet-switched, and other message packets are circuit-switched.

Most message-passing networks have (1) message-passing activities in which the network transports messages from a source terminal node to a destination terminal node, and (2) service activities in which a service processor controls, initializes, interrogates, or otherwise services the communication network. These contrasting functions may be implemented by separate communication networks, each connecting all network devices. Alternatively, the message-passing and the service activities may be time-multiplexed in a single unified network.

The requirements of network service differ in several respects from the standard message passing activities of the communication network. A service processor is highly likely to send or receive a number of service message packets to or from one particular network device before commencing communication with a different network device. That is, there exists a high degree of temporal locality in service communications. Furthermore, after completing a communication with one particular network device, the service processor is highly likely to send or receive service message packets to a second network device which is close to the previous device in the communication network. That is, there also exists a high degree of spatial locality in service communications. Another attribute of network service is that the same information is likely to be sent to many different nodes. For example, the dynamic random access memory of every processing node of the network may be initialized with the same information.

Another respect in which servicing a network differs from standard message-passing is that typically only one message source services the entire network or a distinct portion of the network. In this case, the source (for example, a service processor) is the sole controller of network services for all or a part of the network.

In totally circuit-switched networks, a message is selectively interpreted by devices on the current circuit. Each device may contain a device identification register loaded with a unique value identifying that device. For a network containing N devices, each device identification register must therefore contain at least $\log_2 N$ binary digits. Each message contains a device identification field which also contains at least $\log_2 N$ binary digits. A message which is sent through the devices in a configured circuit is interpreted by a device only when the device identification field of the message is identical to the contents of the device identification register of the device, Because every device identification register contains a unique value, a maximum of one device along a circuit will act upon the message.

SUMMARY OF THE INVENTION

It is an object of the invention to provide a communication network in which a message can be sent to and received by any one device in the network.

It is another object of the invention to provide a communication network in which a message can be sent to and received by a group of two or more devices in the network.

It is a further object of the invention to provide a communication network with simple and fast identification of the device or devices in the network to which a message is directed.

A communication network according to the invention comprises a service processor node and a plurality of terminal nodes. A network of switch nodes switchably connect the service processor node to each terminal node by way of one or more connection paths. Each switch node is connected to the service processor node either directly or through one or more other switch nodes. Each terminal node is connected to a switch node.

Each switch node and each terminal node of the communication network according to the invention has a device identification. At least two nodes have the same device identification.

Preferably, each target node having the same device identification as another node can be connected to the service processor by way of at least one connection path which does not include any other node having the same device identification as the target node.

Each connection path from the service processor to a target switch node has a connection path length equal to the number of intermediate switch nodes along the connection path from the service processor to but not including the target switch node. Each switch node has a minimum connection path length to the service processor. In one aspect of the invention, all switch nodes having the same minimum connection path length have the same device identification. Switch nodes having different minimum connection path lengths to the service processor have different device identifications.

In another aspect of the invention, at least a first set of terminal nodes have a first terminal node device identification. A second set of terminal nodes different from the first set of terminal nodes have a second terminal node device identification different from the first terminal node device identification. The first set of terminal nodes may comprise, for example, processor nodes. The second set of terminal nodes may comprise, for example, input/output nodes. Preferably, no terminal nodes have the same device identification as a switch node.

Each switch node and each terminal node in the communication network according to the invention may comprise, for example, an input for receiving electronic service instruction signals. Each electronic service instruction signal contains a device identification signal. A device identification register in each switch node and each terminal node contains the device identification of the node. A comparison circuit compares the device identification signal of an electronic service instruction signal with the device identification stored in the device identification register.

Each switch node and each terminal node of the communication network according to the invention may comprise a password recognition circuit for receiving electronic service password signals. The password recognition circuit stores a device identification in the device identification register of the node when an electronic service password signal is recognized.

In one aspect of the invention, the service processor outputs electronic service instruction signals into the network of switch nodes. Each electronic service instruction signal contains a device identification signal.

Each switch node and each terminal node in the communication network which receives an electronic service instruction signal containing a device identification signal matching the device identification of the switch node or the terminal node executes the service instruction.

The invention is also a method of establishing a connection path from a source device to a target node in a communication network of the type comprising a source device, a plurality of terminal nodes, and a network of switch nodes for switchably connecting the source device to each terminal node by way of one or more connection paths. Each terminal node has a device identification, each switch node has a device identification, and at least two nodes have the same device identification. Each switch node is connected to the source device either directly or through one or more other switch nodes, and each terminal node is connected to a switch node.

A connection path from tile source device to the target node is established by identifying one or more intermediate switch nodes along a connection path from the source device to but not including the target node. Connection paths from the source device to each identified intermediate switch node are then sequentially formed in an order from the identified intermediate switch node closest to the source device to the identified intermediate switch node farthest from the source device. A connection path is then formed from the identified intermediate switch node farthest from the source device to the target node.

The invention is also a method of establishing a connection path from a source device to a plurality of target nodes in a communication network of the type comprising a source device, a plurality of terminal nodes, and a network of switch nodes for switchably connecting the source device to each terminal node by way of one or more connection paths. Each terminal node has a device identification, each switch node has a device identification, and at least two nodes have the same device identification. Each switch node is connected to the source device either directly or through one or more other switch nodes, and each terminal node is connected to a switch node.

A connection path from the source device to the plurality of target nodes is established by identifying one or more intermediate switch nodes along a plurality of connection paths from the source device to but not including the target nodes. Connection paths from each identified intermediate switch node to each target device are sequentially formed in an order from the identified intermediate switch node farthest from the source device to the identified intermediate switch node closest to the source device.

In one aspect of the method of forming a connection path from the source device to a plurality of target nodes, the connection path from a selected identified intermediate switch node to a target device is generated by forming a connection path from the source device to the selected identified intermediate switch node. Thereafter, a connection path is formed from the selected identified intermediate switch node to the target device.

Preferably, each target node having the same device identification as another node can be connected to the service processor by way of at least one connection path which does not include any other node having the same device identification as the target node.

By providing a communication network in which at least two nodes have the same device identification, a message can be sent to and received by a group of two or more devices in the network.

By providing, for each node having the same device identification as another node, at least one connection path to the service processor which does not include any other node having the same device identification, a message can be sent to any single one of the communication network nodes.

By sharing device identifications according to the present invention, fewer binary digits are required for device identification signals, thereby simplifying and speeding identification of the device in a network to which a message is directed.

DESCRIPTION OF THE PREFERRED EMBODIMENTS

Figure 1:
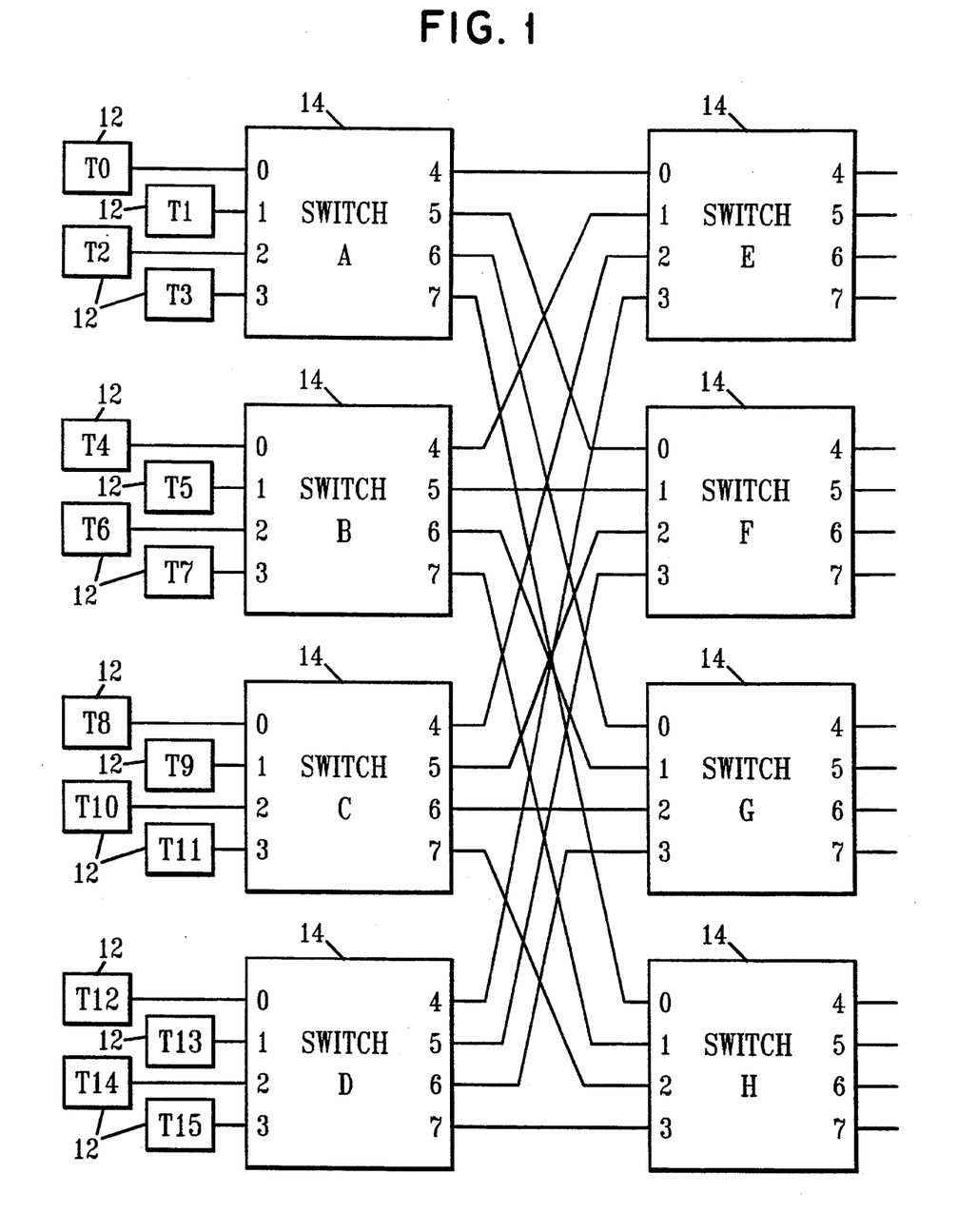
FIG. 1 is a block diagram of an example of communication network according to the invention.

FIG. 1 is a block diagram of an example of a communication network according to the invention. The communication network comprises a service processor 10, also designated T0. The service processor 10 may be, for example, a microprocessor programmed to provide a sequence of data signals at an output thereof.

The communication network further comprises a plurality of terminal nodes 12, also designated T1 through T15. The terminal nodes may comprise, for example, microprocessors, memory elements, input/output servers, or other computer devices.

A network of switch nodes 14 is provided for switchably connecting the service processor 10 to each terminal node 12 by way of one or more connection paths. Each switch node 14 is connected to the service processor 10 either directly or through one or more other switch nodes 14. Each terminal node 12 is connected to a switch node 14.

Each switch node 14 and each terminal node 12 has a device identification. At least two nodes have the same device identification.

Table 1 shows a hypothetical example of the device identification for each terminal node 12 and each switch node 14 in the communication network of FIG. 1.

service processor T0 to a target node, Table 1 lists all of the nodes along the connection path, and lists the port of the switch node to which the target node is connected. As shown in Table 1, each of the terminal nodes T1 through T12 having the same device identification of "1" can be connected to the service processor T0 by way of at least one connection path which does not include any other node having the same device identification of "1". Similarly, each terminal node T13 through T15 having the same device identification of "2" can be connected to the service processor T0 by way of at least one connection path which does not include any other node having the same device identification of "2".

Moreover, switch nodes E through H having the device identification "7" can be connected to the service processor T0 by way of at least one connection path which does not include any other node having the device identification "7", and switch nodes B through D having the device identification "8" can be connected to the service processor T0 by way of at least one connection path which does not include any other node having the device identification "8". Since nodes having the same device identification are connected to the service processor T0 by different connection paths, messages call be sent to any one of the devices having a common device identification. Alternatively, a message

TABLE 1

| Target Node | Node Type | Device Identification | Paths to Service Processor |
|---|---|---|---|
| T0 | service | not applicable | not applicable |
| T1 | processor | 1 | {A1} |
| T2 | processor | 1 | {A2} |
| T3 | processor | 1 | {A3} |
| T4 | processor | 1 | {A-E-B0}, {A-F-B0}, {A-G-B0}, {A-H-B0}, |
| T5 | processor | 1 | {A-E-B1}, {A-F-B1}, {A-G-B1}, {A-H-B1}, |
| T6 | processor | 1 | {A-E-B2}, {A-F-B2}, {A-G-B2}, {A-H-B2}, |
| T7 | processor | 1 | {A-E-B3}, {A-F-B3}, {A-G-B3}, {A-H-B3}, |
| T8 | processor | 1 | {A-E-C0}, {A-F-C0}, {A-G-C0}, {A-H-C0}, |
| T9 | processor | 1 | {A-E-C1}, {A-F-C1}, {A-G-C1}, {A-H-C1}, |
| T10 | processor | 1 | {A-E-C2}, {A-F-C2}, {A-G-C2}, {A-H-C2}, |
| T11 | processor | 1 | {A-E-C3}, {A-F-C3}, {A-G-C3}, {A-H-C3}, |
| T12 | processor | 1 | {A-E-D0}, {A-F-D0}, {A-G-D0}, {A-H-D0}, |
| T13 | input/output | 2 | {A-E-D1}, {A-F-D1}, {A-G-D1}, {A-H-D1}, |
| T14 | input/output | 2 | {A-E-D2}, {A-F-D2}, {A-G-D2}, {A-H-D2}, |
| T15 | input/output | 2 | {A-E-D3}, {A-F-D3}, {A-G-D3}, {A-H-D3}, |
| A | switch | 6 | directly connected |
| B | switch | 8 | {A-E1}, {A-F1}, {A-G1}, {A-H1} |
| C | switch | 8 | {A-E2}, {A-F2}, {A-G2}, {A-H2} |
| D | switch | 8 | {A-E3}, {A-F3}, {A-G3}, {A-H3} |
| E | switch | 7 | {A4} |
| F | switch | 7 | {A5} |
| G | switch | 7 | {A6} |
| H | switch | 7 | {A7} |

As shown in Table 1, nodes T1 through T12 have a device identification of "1". Nodes T13 through T15 have a device identification of "2". Switch node A has a device identification of "6". Switch nodes E through H have a device identification of "7". Switch nodes B through D have a device identification of "8".

In one aspect of the invention, each node having the same device identification as another node can be connected to the service processor by way of at least one connection path which does not include any other node having the same device identification.

For each terminal node 12 and for each switch node 14 shown in FIG. 1, Table 1 lists one or more connection paths from the service processor 10 to the terminal node 12 or switch node 14. (Many other possible connection paths exist, but are not shown in FIG. 1.) As shown in FIG. 1, for each connection path from the can be sent to two or more devices having a common device identification.

As shown in FIG. 1, each connection path from the service processor T0 to a target switch node 14 has a connection path length equal to the number of intermediate switch nodes along the connection path from the service processor 10 to but not including the target switch node 14. Each switch node 14 has a minimum connection path length to the service processor node 10. Preferably, according to the invention, all switch nodes 14 having the same minimum connection path length have the same device identification.

Referring again to Table 1, in this hypothetical example of a communication network according to the invention, all switch nodes 14 having a minimum connection path length of zero to the service processor 10 have a device identification of "6". All switch nodes 14 having a minimum connection path length to the service processor 10 of one intermediate switch node have the device identification "7". Finally, all switch nodes 14 having a minimum connection path length to the service processor 10 of two intermediate switch nodes have the device identification "8".

Similarly, as shown in Table 1, switch nodes 14 having different minimum connection path lengths to the service processor 10 have different device identifications.

According to the invention, at least a first set of terminal nodes 12 have a first terminal node device identification. A second set of terminal nodes 12 different from the first set of terminal nodes 12 have a second terminal node device identification different from the first terminal node device identification.

As shown in Table 1, the first set of terminal nodes 12 may comprise processor nodes T1 through T12. The second set of terminal nodes 12 may comprise, for example, input/output nodes T13 through T15. Alternatively, all terminal nodes 12 may have the same device identification, or they may be divided into more than two groups having different device identifications. Preferably, however, no terminal nodes 12 have the same device identification as a switch node 14.

In order to provide each switch node 14 and each terminal node 12 with a device identification, each switch node 14 and each terminal node 12 may comprise, for example, an input for receiving electronic service instruction signals. Each electronic service instruction signal contains a device identification signal.

Figure 2:
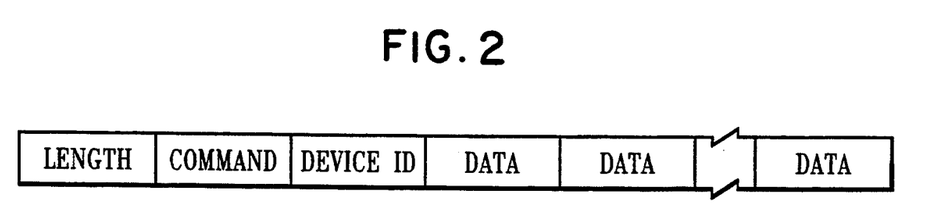
FIG. 2 schematically shows an example of the form of a service instruction signal for servicing nodes in the communication network.

FIG. 2 schematically shows an example of the form of a service instruction signal. In this example, each service instruction signal starts with an 8-bit length byte, followed by an 8-bit service command byte, followed by an 8-bit device identification byte, followed by one or more 8-bit data bytes. The length byte contains a number equal to the total length of the message, including the length byte itself. The service command byte contains an instruction code. The device identifier byte contains a number which identifies one or more devices (nodes) in the communication network.

Each switch node 14 and each terminal node 12 may also comprise a device identification register containing the device identification of the node. A comparison circuit in each switch node 14 and each terminal node 12 compares the device identification signal of an electronic service instruction signal with the device identification stored in the device identification register.

Each switch node 14 and each terminal node 12 may also comprise a password recognition circuit for receiving electronic service password signals. The password recognition circuit stores a device identification in the device identification register of the node when an electronic service password signal is recognized.

The service processor 10 outputs electronic service instruction signals into the network of switch nodes 14. As shown in FIG. 2, each electronic service instruction signal contains a device identification signal. Each switch node 14 and each terminal node 12 which receives an electronic service instruction signal containing a device identification signal matching the device identification of the switch node 14 or terminal node 12 executes the service instruction.

FIGS. 3 through 9 show an example of the construction of a switch node 14. The device identification register, the comparison circuit, the password recognition circuit, and the instruction execution circuit of a terminal node 12 may be the same as the circuits performing these functions in a switch node 14.

Figure 3:
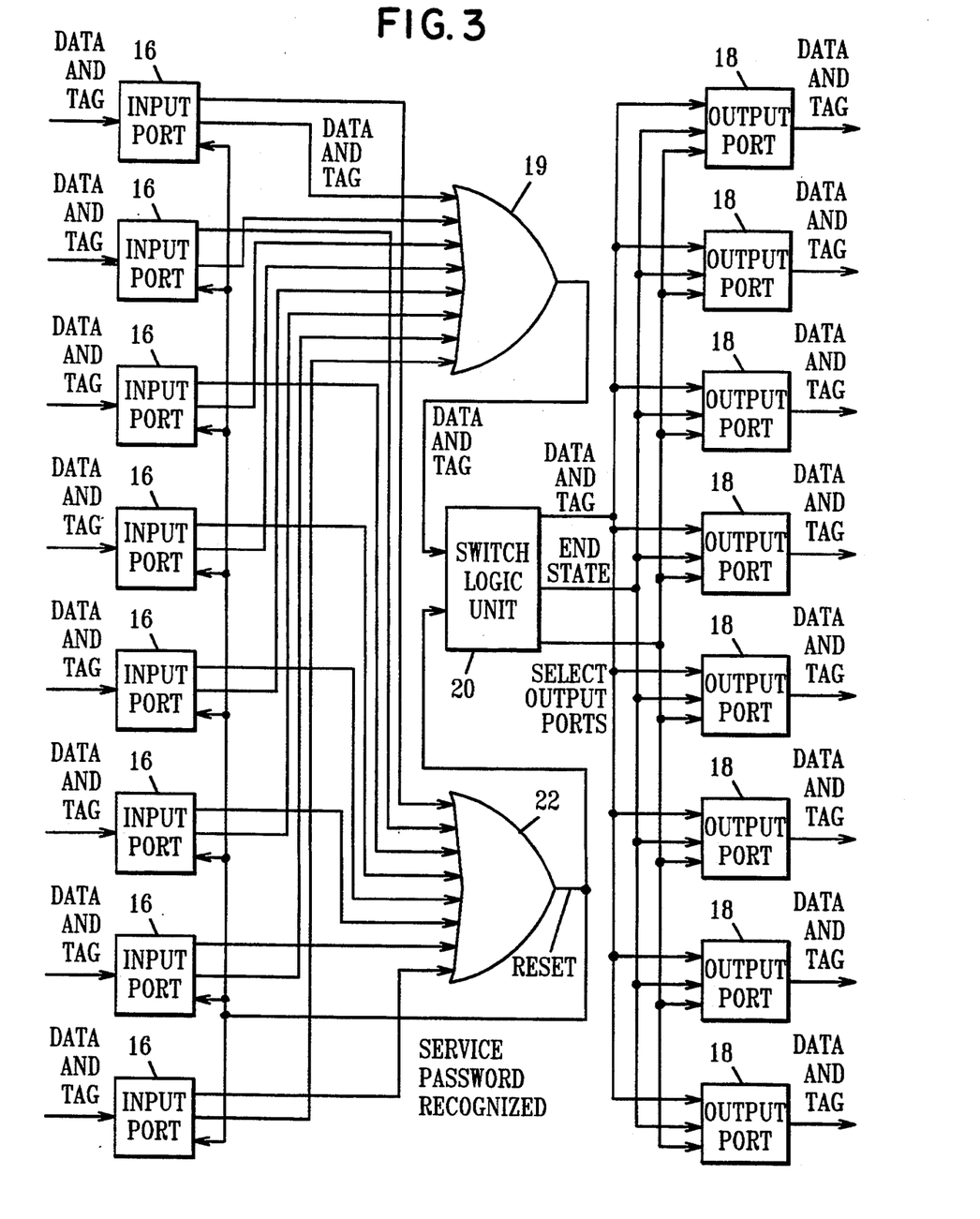
FIG. 3 is a block diagram of an example of a switch node for the communication network according to the invention.

FIG. 3 is a block diagram of an example of a switch node 14 of FIG. 1. In this example, the switch node comprises eight input ports 16 and eight output ports 18, for a total of eight full duplex connections. Each input port 16 receives a data signal and a tag signal. For example, each data signal may comprise eight bits. Each tag signal may comprise one bit indicating the presence or absence of valid data.

Each input port 16 has a data and tag output connected to an input of an OR gate 19. The output of OR gate 19 provides a series of data signals and tag signals from one input port 16 to to the inputs of all of the output ports 18 by way of a switch logic unit 20. Under the control of a service password message discussed further below, one input port is selected to pass a data signal and a tag signal to the output ports 18. Under the control of switch logic unit 20, one or more of the output ports 18 will output the data signal and the tag signal received from the input port.

Each input port 16 has a "service password recognized" output connected to an input of an OR gate 22. Whenever an input port 16 recognizes the service password message, the OR gate 22 generates a reset signal which prevents all of the other input ports 16 from passing data and tag signals to the output ports 18.

Figure 4:
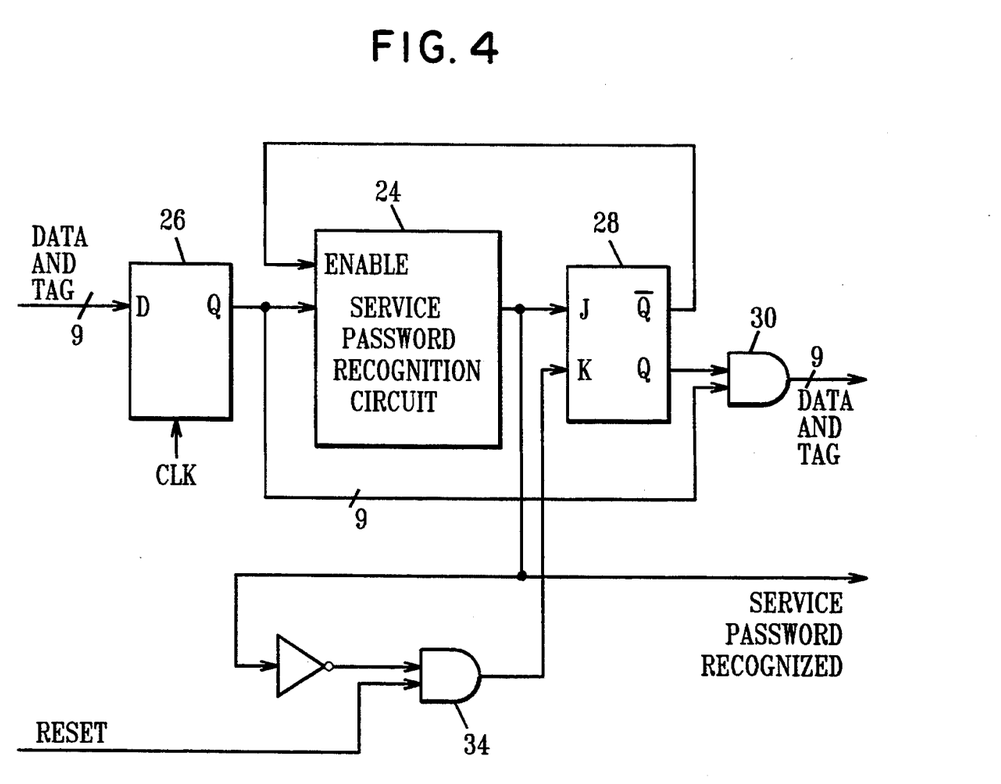
FIG. 4 schematically shows an example of an input port for the switch node of FIG. 3.

FIG. 4 schematically shows an example of an input port 16 of the switch node of FIG. 3. When service password recognition circuit 24 receives a service password message from latch 26, a service password recognized signal is stored in J-K flip-flop circuit 28. The "true" output Q of flip-flop circuit 28 enables an AND gate 30 to output the data signal and the tag signal to the inputs of output ports 18 by way of switch logic unit 20. At the same time, the complement output $\overline{Q}$ of flip-flop 28 disables the service password recognition circuit 24 so subsequent service password messages received by the input port will pass through the input port to the remainder of the communication network.

The service password recognized signal generated by service password recognition circuit 24 is output to OR gate 22 of FIG. 3 in order to reset all other input ports 16 of the switch node. As shown in FIG. 4, when the input port receives a reset signal from another input port 16, and when the service password recognition circuit 24 of the input port does not recognize a service password, the inverter 32 and the AND gate 34 drive the K input of J-K flip-flop 28. The Q output of J-K flip-flop 28 changes to 0 thereby disabling AND gate 30, and preventing data signals and tag signals from being passed through the input port to the inputs of the output ports 18. The $\overline{Q}$ output of flip-flop 28 changes to "1" thereby enabling the service password recognition circuit 24 to recognize subsequent service password messages received by the input port.

Figure 5:
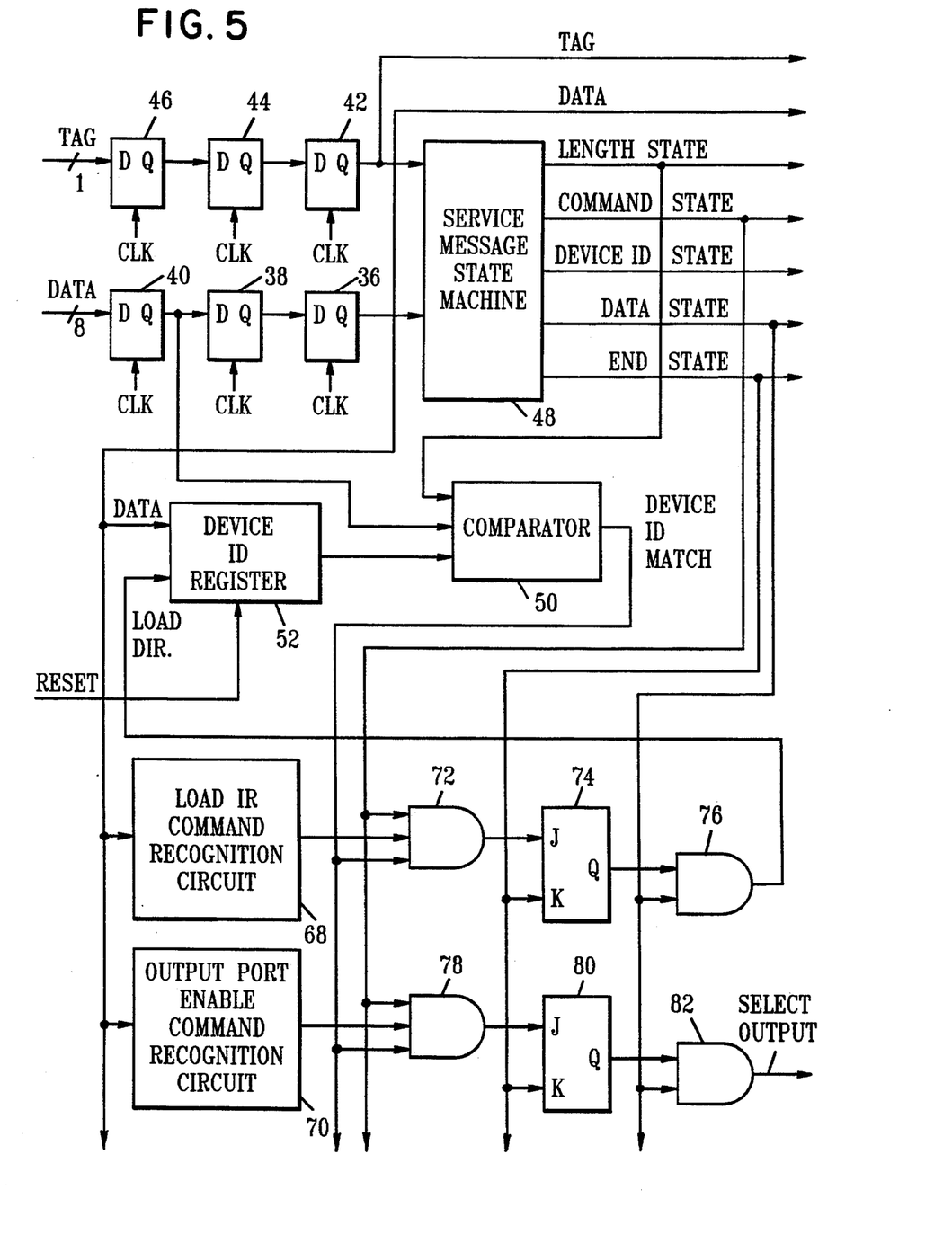
FIG. 5 schematically shows an example of a switch logic unit for the switch node of FIG. 3.

FIG. 5 schematically shows an example of the switch logic unit 20 of FIG. 3. As shown in FIG. 5, latches 36, 38, and 40 store the three most recent data signal bytes, and latches 42, 44, and 46 store the three most recent tag signals. For service instruction signals having the format shown in FIG. 2, when latch 36 contains the length byte of an instruction signal, latch 38 contains the command byte, and latch 40 contains the device identification byte. It is assumed that the first three bytes of each message arrive contiguously at the input to switch logic unit 20.

The switch logic unit 20 further comprises a service message state machine 48. The service message state machine 48 receives the data and tag signals from all input port 16 and outputs state signals which depend on the data byte which is being received.

Figure 6:
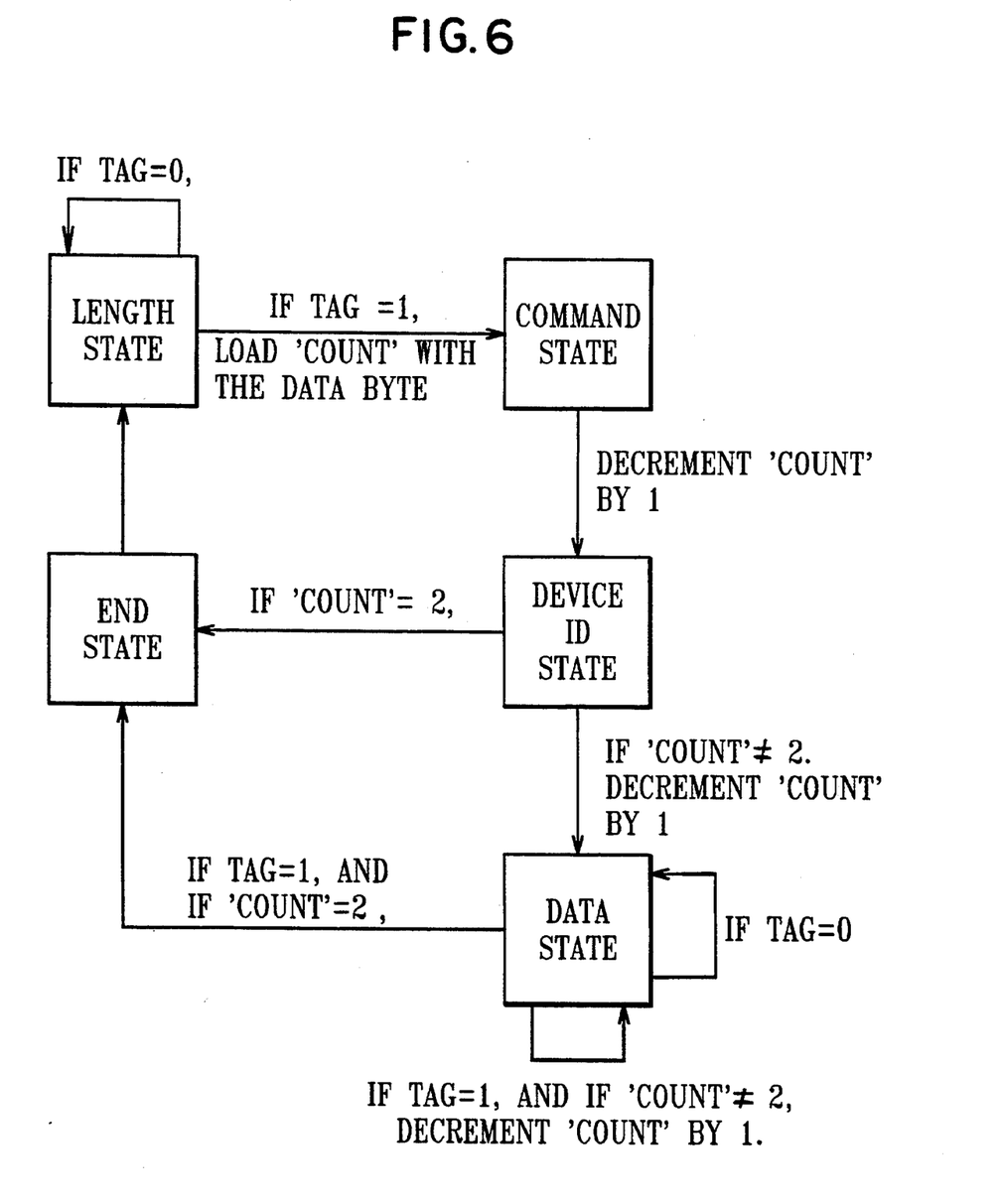
FIG. 6 is a block diagram of an example of a service message state machine for the switch logic unit of FIG. 5.

FIG. 6 is a block diagram of an example of a service message state machine 48. In this example, the service message state machine 48 starts in the length state, and remains in that state so long as the tag bit in latch 42 is 0. When the length byte of a message is stored in latch 36, the accompanying length byte tag bit of 1 is stored in latch 42. The service message state machine 48 then moves from the length state to a command state, and sets a counter with the value of the length byte from latch 36. On the next cycle, the command byte from the message is received, the count is decremented by 1, and the service message state machine 48 moves from the command state to the device identification state.

From the device identification state, if the count is not equal to 2, the count is decremented by 1, and the service message state machine 48 moves to the data state. If the count is equal to 2, the service message state machine 48 moves to the end state.

From the data state, for each cycle during which the tag bit is 0, the service message state machine 48 remains in the data state, and the count remains unchanged. For each cycle during which the tag bit is 1, and during which the count is not equal to 2, the service message state machine 48 remains in the data state, and the count is decremented by 1. When the tag bit is 1, and the count is equal to 2, the service message state machine 48 moves to the end state.

From the end state, the service message state machine 48 returns to the length state. Consequently, there must be at least one cycle between the last data byte of a message and the length byte of the next following message.

The switch logic unit 20 also comprises a comparator 50 for comparing the device identification signal of an electronic service instruction signal with the device identification stored in a device identification register 52. The service message state machine 48 enables the comparator 50 when the service message state machine is in the length state. At that time, the latch 40 contains the device identification byte of the message. (FIG. 2.) The comparator compares the device identification byte in latch 40 with the contents of device identification register 52. If the device identification byte is the same as the contents of device identification register 52, the comparator 50 outputs a device identification match signal.

Figure 7:
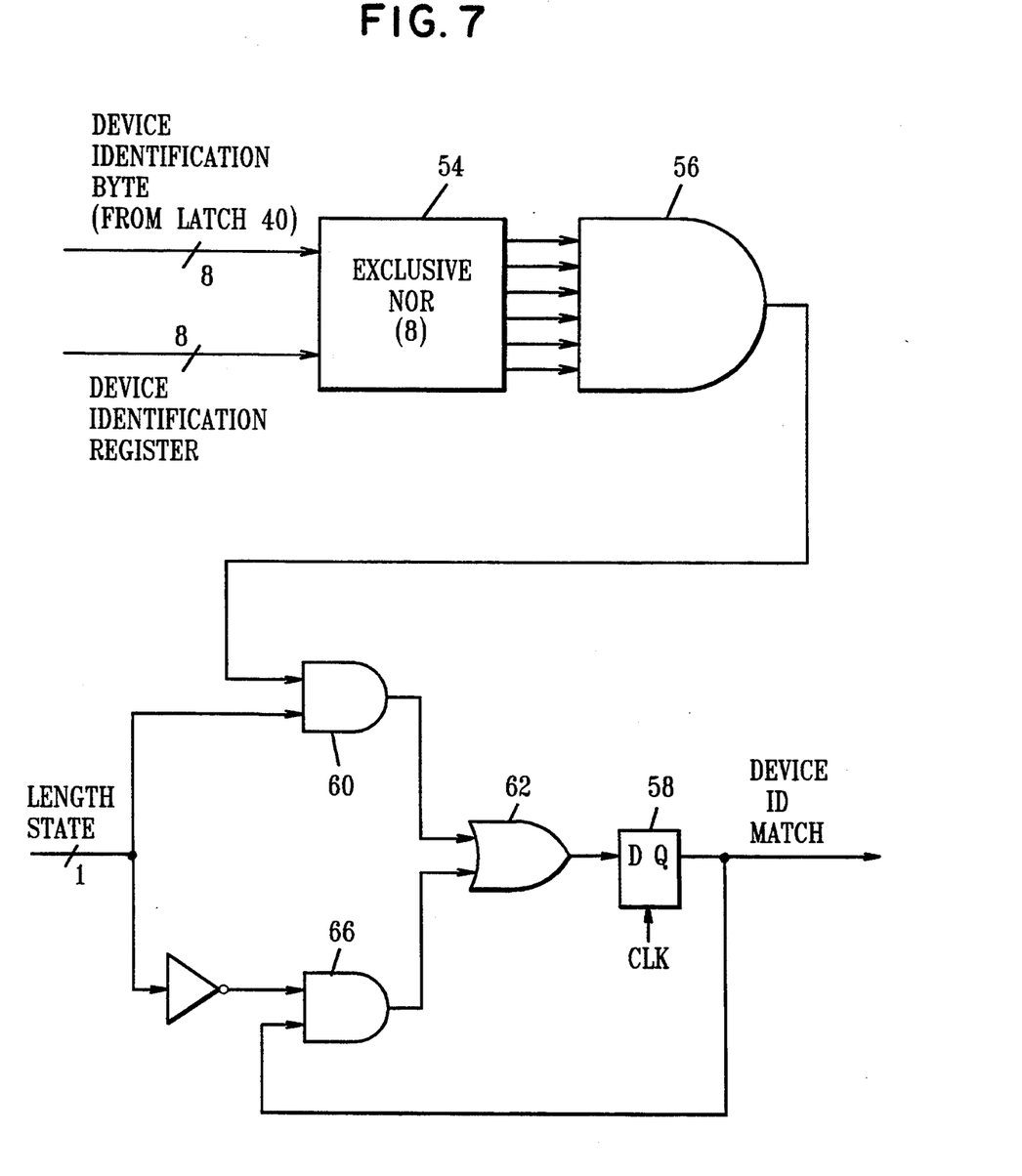
FIG. 7 schematically shows all example of a comparator for use in the switch logic unit of FIG. 5.

FIG. 7 schematically shows an example of the comparator 50 of FIG. 5. A group of eight EXCLUSIVE NOR gates 54 compare the individual bits of the device identification byte from latch 40 of FIG. 5, with the individual bits in the device identification register 52 of FIG. 5. If all eight bits match, then AND gate 56 indicates a match. If the length state signal from the service message state machine 48 is active, then the output of AND gate 56 is stored in latch 58, by way of AND gate 60 and OR gate 62. On the other hand, if the service message state machine is not in the length state, the previous contents of latch 58 are restored therein by way of inverter 64, AND gate 66, and OR gate 62.

Returning to FIG. 5, after the service message state machine 48 receives the length byte and accompanying tag from latches 36 and 42, the service message state machine moves to the command state. At the same time the command byte and accompanying tag move from latches 38 and 44 into latches 36 and 42.

The command byte in latch 36 is provided to command recognition circuits, such as the load device identification register command recognition circuit 68 and the output port enable command recognition circuit 70. If the load device identification register command recognition circuit 68 recognizes a command byte at the same time as the service message machine 48 is in the command state and the comparator 50 has generated a device identification match, then AND gate 72 causes flip-flop 74 to generate an output signal Q=1. When the service message state machine subsequently enters the data state, the AND gate 76 produces a "load device identification register" signal causing the device identification register 52 to load the data byte in latch 36 as a new device identification.

Similarly, if the output port enable command recognition circuit 70 recognizes an output port enable command at the same time that the service message state machine is in the command state and the comparator 50 indicates a device identification match, then AND gate 78 causes the flip-flop 80 to provide an output of Q=1. When the service message state machine 48 subsequently enters the data state, then AND gate 82 produces a "select output port signal" (to be further described below).

Figure 8:
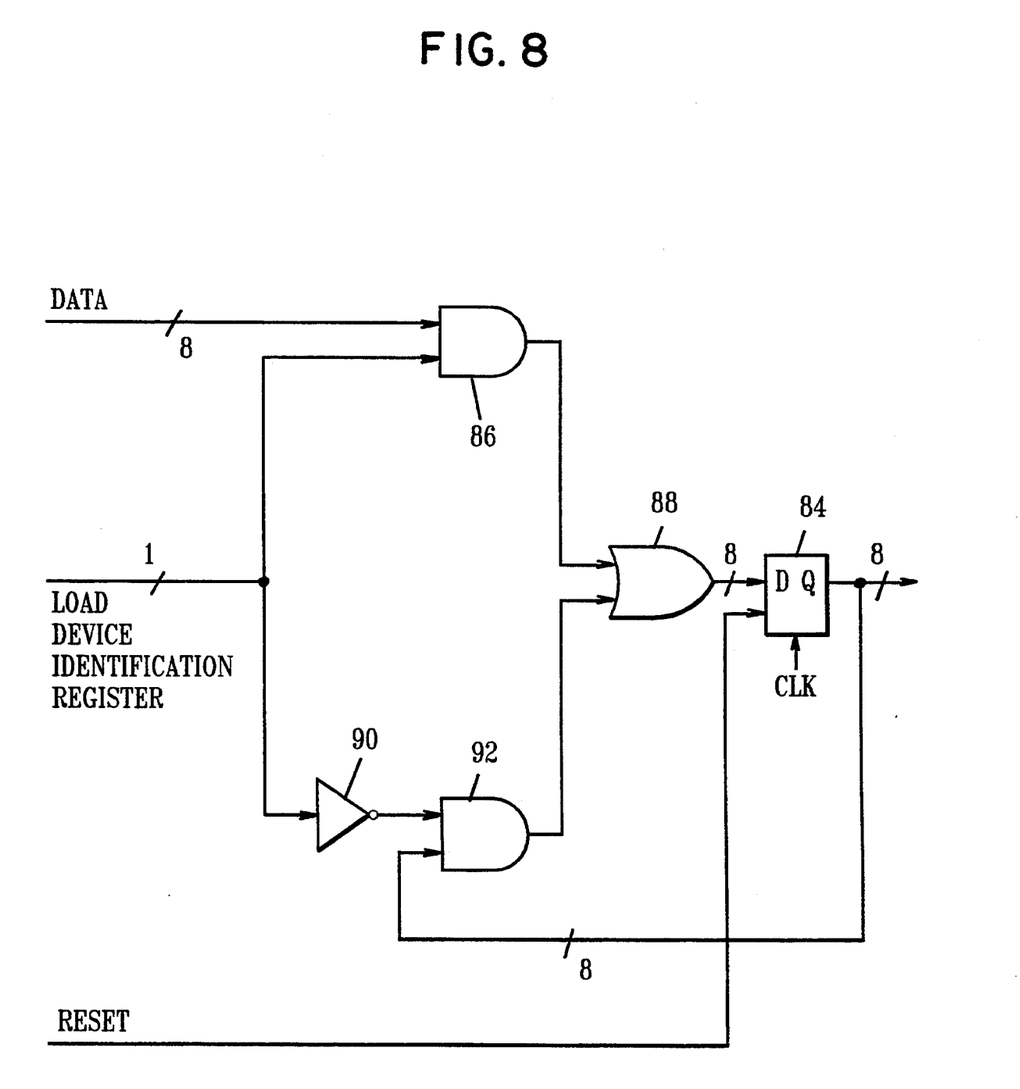
FIG. 8 schematically shows an example of a device identification register for use in the switch logic unit of FIG. 5.

FIG. 8 schematically shows an example of the device identification register 52 of FIG. 5. When the load device identification register signal is active, the data byte in latch 36 of FIG. 5 is stored in latch 84 of FIG. 8 by way of AND gate 86 and OR gate 88. In the absence of all active load device identification register signal, the contents of latch 84 are restored therein by way of inverter 90, AND gate 92, and OR gate 88. The contents of latch 84 are reset to zero (that is, a device identification of zero is stored in latch 84) when a reset signal is received from the OR gate 22 of FIG. 3 (indicating that one of the input ports 16 has recognized a service password message, and that the device identification register 52 will be reset).

Figure 9:
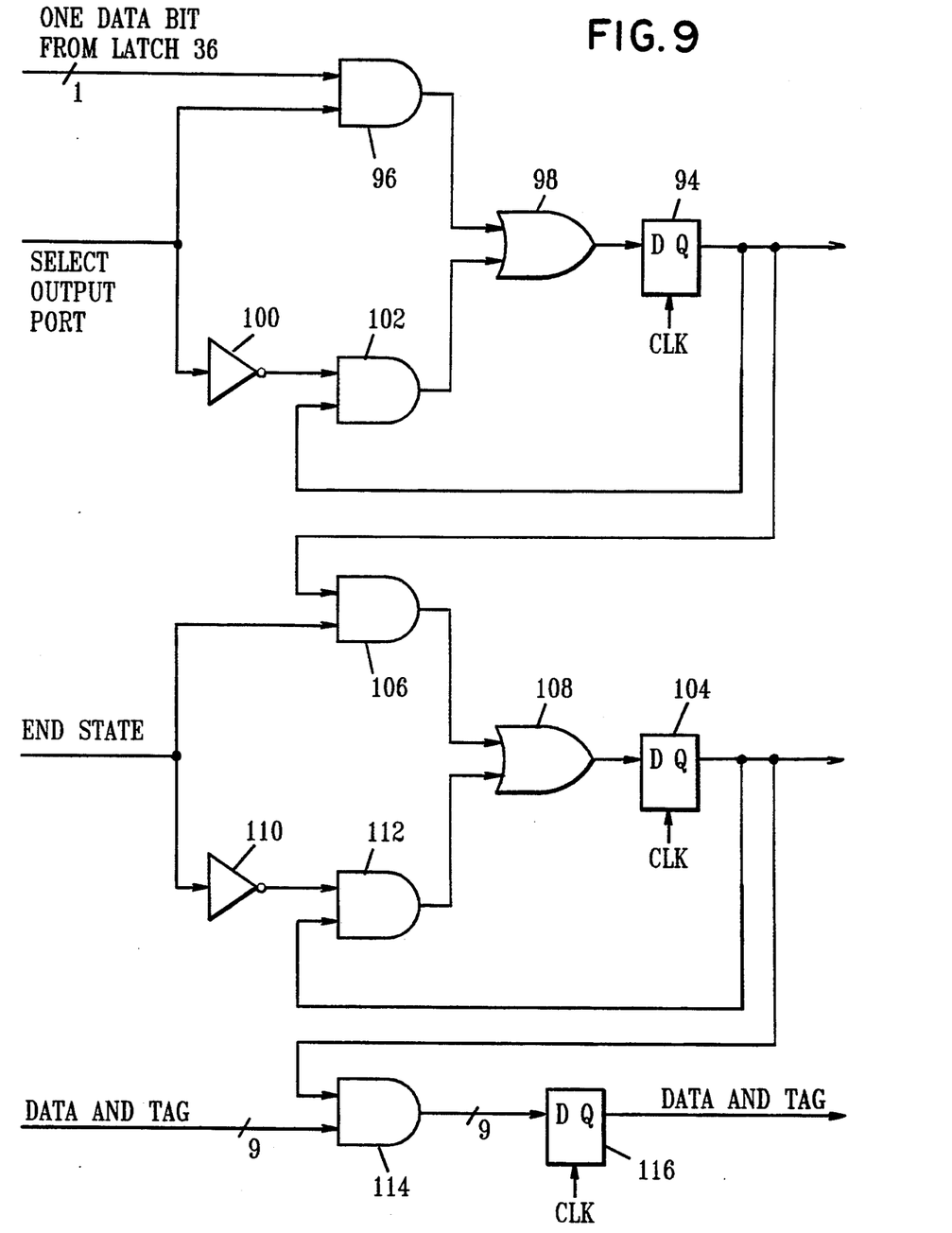
FIG. 9 schematically shows an example of an output port for the switch node of FIG. 3.

FIG. 9 schematically shows an example of an output port 18 for the switch node of FIG. 3. When the AND gate 82 of FIG. 5 generates a select output port signal, the eight bits contained in latch 36 identify zero to eight output ports 18 to be enabled. As shown in FIG. 9, each output port receives one data bit from latch 36. If the select output port signal is active, the data bit from latch 36 is stored in latch 94 by way of AND gate 96 and OR gate 98. If the select output port signal is not active, the contents of latch 94 are restored therein by way of inverter 100, AND gate 102, and OR gate 98.

When the service message state machine 48 of FIG. 5 reaches the end state, the contents of latch 94 are stored in latch 104 by way of AND gate 106 and OR gate 108. Otherwise, the contents of latch 104 are restored therein by way of inverter 110 and AND gate 112. So long as latch 104 has an output Q=1, the AND gate 114 passes data signals and tag signals to the output latch 116, thereby enabling the output port.

The service processor 10 can be programmed to assign device identifications to each terminal node and each switch node in the communication network by first preloading information about the connections in the network into a data base. Based on the connectivity information stored in the service processor, the device identification register of each terminal node and each switch node is set to a desired value by first sending a service password message to the node in order to reset the contents of the device identification register to zero, and then by sending a load device identification register command to the terminal node 12 or to the switch node 14 with a data byte containing the selected device identification.

As described above in connection with FIG. 4, after a switch node recognizes the service password message, the service password recognition circuit 24 is disabled, allowing subsequent messages containing the service password to be sent to more remote switch nodes and terminal nodes.

After each terminal node and switch node of the communication network has been assigned a device identification, a simple connection path to a target node from the service processor 10 can be set up by the service processor as follows. Based on the information contained in the service processor about the connections within the communication network, the service processor identifies all of the intermediate switch nodes needed to connect the service processor to the target node. Starting with the intermediate switch node closest to the service processor, the service processor 10 sequentially sends output port enable command instructions to each intermediate switch node to enable the output port needed in the desired connection path.

The service processor 10 can be programmed to broadcast a message to a plurality of target nodes as follows. Based on the information about the communication network connections which is stored in the service processor, one or more intermediate switch nodes along a plurality of connection paths from the source device to but not including the target nodes are identified. Connection paths from each identified intermediate switch node to each target device are then sequentially formed in an order from the identified intermediate switch node farthest from the source device to the identified intermediate switch node closest to the source device.

A connection path from a selected identified intermediate switch node to a target device may be generated by forming a connection path from the source device to the selected identified intermediate switch node, and then forming a connection path from the selected identified intermediate switch node to the target device.

We claim:

1. A communication network comprising:
   a service processor;
   a plurality of terminal nodes; and
   a network of switch nodes for switchably connecting the service processor to each terminal node by way of one or more connection paths, each switch node being connected to the service processor either directly or through one or more other switch nodes, each terminal node being connected to a switch node;
   wherein each switch node and each terminal node has a device identification, at least two nodes having the same device identification, and wherein each switch node and each terminal node that shares a common device identification with another switch node or terminal node can be connected to the service processor by way of at least one connection path which does not include any other switch node or terminal node having the common device identification.

2. A communication network as claimed claim 1, characterized in that:
   each connection path from the service processor to a target switch node has a connection path length equal to the number of intermediate switch nodes along the connection path from the service processor to but not including the target switch node;
   each switch node has a minimum connection path length to the service processor; and
   all switch nodes having the same minimum connection path length have the same device identification.

3. A communication network as claimed in claim 2 characterized in that switch nodes having different minimum connection path lengths to the service processor have different device identifications.

4. A communication network as claimed in claim 3, characterized in that at least a first set of terminal nodes have a first terminal node device identification.

5. A communication network as claimed in claim 4, characterized in that a second set of terminal nodes different from the first set of terminal nodes have a second terminal node device identification different from the first terminal node device identification.

6. A communication network as claimed in claim 5, characterized in that the first set of terminal nodes comprises processor nodes, and the second set of terminal nodes comprises input/output nodes.

7. A communication network as claimed in claim 6, characterized in that no terminal nodes have the same device identification as a switch node.

8. A communication network as claimed in claim 8, characterized in that each switch node and each terminal node comprises:
   an input for receiving electronic service instruction signals, each electronic service instruction signal containing a device identification signal;
   a device identification register containing the device identification of the node; and
   a comparison circuit for comparing the device identification signal of an electronic service instruction signal with the device identification stored in the device identification register.

9. A communication network as claimed in claim 8, characterized in that each switch node and each terminal node comprises a password recognition circuit for receiving electronic service password signals, and for storing a device identification in the device identification register of the node when an electronic service password signal is recognized.

10. A communication network as claimed in claim 9, characterized in that:
    the service processor outputs electronic service instruction signals into the network of switch nodes, each electronic service instruction signal containing a device identification signal; and
    each switch node and each terminal node receiving an electronic service instruction signal containing a device identification signal matching the device identification of the switch node or the terminal node executes the service instruction.

11. A method of establishing a connection path from a source device to a target node in a communication network comprising:
    a source device;
    a plurality of terminal nodes, each terminal node having a device identification; and
    a network of switch nodes for switchably connecting the source device to each terminal node by way of one or more connection paths, each switch node being connected to the source device either directly or through one or more other switch nodes, each terminal node being connected to a switch node, each switch node having a device identification, at least two nodes having the same device identification;

said method comprising the steps of:

identifying one or more intermediate switch nodes along a connection path, from the source device to but not including the target node;

sequentially forming a connection path from the source device to each identified intermediate switch node in an order from the identified intermediate switch node closest to the source device to the identified intermediate switch node farthest from the source device; and forming a connection path from the identified intermediate switch node farthest from the source device to the target node.

12. A method of establishing a connection path from a source device to a plurality of target nodes in a communication network comprising:

a source device;

a plurality of terminal nodes, each terminal node having a device identification; and a network of switch nodes for switchably connecting the source device to each terminal node by way of one or more connection paths, each switch node being connected to the source device either directly or through one or more other switch nodes, each terminal node being connected to a switch node, each switch node having a device identification, at least two nodes having the same device identification;

said method comprising the steps of:

identifying one or more intermediate switch nodes along a plurality of connection paths from the source device to but not including the target nodes;

sequentially forming a connection, path from each identified intermediate switch node to each target node in an order from the identified intermediate switch node farthest from the source device to the identified intermediate switch node closest to the source device.

13. A method as claimed in claim 12, characterized in that the step of forming a connection path from a selected identified intermediate switch node to a target node comprises the steps of:

forming a connection path from the source device to the selected identified intermediate switch node; and then forming a connection path from the selected identified intermediate switch node to the target node.

14. A method as claimed in claim 13, characterized in that each target node having the same device identification as another node can be connected to the source device by way of at least one connection path which does not include any other node having the same device identification as the target node.

* * * * *